United States Patent
Tee et al.

(10) Patent No.: US 8,334,227 B2
(45) Date of Patent: *Dec. 18, 2012

(54) BREATHABLE, CHEMICAL RESISTANT, DURABLE, AND WATERPROOF COATED POROUS MEMBRANE

(75) Inventors: Yit-Hong Tee, Lee's Summit, MO (US); Taher Abujoudeh, Lee's Summit, MO (US)

(73) Assignee: BHA Group, Inc., Kansas City, MO (US)

( * ) Notice: Subject to any disclaimer, the term of this patent is extended or adjusted under 35 U.S.C. 154(b) by 280 days.

This patent is subject to a terminal disclaimer.

(21) Appl. No.: 12/417,476

(22) Filed: Apr. 2, 2009

(65) Prior Publication Data

US 2010/0255741 A1 Oct. 7, 2010

(51) Int. Cl.
*B32B 27/12* (2006.01)
*B32B 3/00* (2006.01)

(52) U.S. Cl. ....... 442/394; 442/99; 442/101; 428/315.5; 428/133; 428/137; 428/160

(58) Field of Classification Search .................. 442/394, 442/397, 398, 79, 85–86; 428/133, 144, 428/160, 137
See application file for complete search history.

(56) References Cited

U.S. PATENT DOCUMENTS

| | | | |
|---|---|---|---|
| 3,639,146 A | | 2/1972 | Andra et al. |
| 4,443,511 A | * | 4/1984 | Worden et al. .............. 428/198 |
| 6,228,477 B1 | | 5/2001 | Klare et al. |
| 2003/0215617 A1 | | 11/2003 | Shehata et al. |
| 2010/0129629 A1 | * | 5/2010 | Tee et al. .................. 428/220 |

FOREIGN PATENT DOCUMENTS

EP 2189285 A1 5/2010
GB 2350073 A 11/2000

OTHER PUBLICATIONS

EP 10157633.8, European Search Report and Written Opinion, Aug. 2, 2010.

* cited by examiner

*Primary Examiner* — Lynda Salvatore
(74) *Attorney, Agent, or Firm* — Cooper Legal Group, LLC

(57) ABSTRACT

A waterproof, vapor-permeable and air-permeable sheet material. The sheet material includes a waterproof microporous polymer substrate and a microporous thermoplastic coating layer attached to the polymer substrate. The thermoplastic coating layer is vapor-permeable and air-permeable. The thermoplastic coating layer is at least partially interpenetrated into pores of the polymer substrate forming an interface that prevents passage of water droplets, while permitting passage of water vapor and air, when a chemical is present on the sheet material that would otherwise cause the polymer substrate to permit passage of water droplets. The interface is resistant to chemical interference with at least the waterproof property of the sheet material.

16 Claims, 2 Drawing Sheets

BREATHABLE, CHEMICAL RESISTANT, DURABLE, AND WATERPROOF COATED POROUS MEMBRANE

FIELD OF THE INVENTION

The present invention relates generally to sheet materials, which can be referred to as membranes or films, and more particularly, to sheet materials that have qualities such as being water penetration resistant, water vapor permeable, air permeable and resistant to significant property degradation resulting from chemical presence.

BACKGROUND OF THE INVENTION

Fluoropolymers and thermoplastic elastomers are known and are used in many different applications, including outdoor sheet materials or films. A layer of fluoropolymer or a layer of thermoplastic elastomer may be utilized to provide some desired properties, such as water vapor and air-permeable (e.g., breathability) or resistance to water penetration. Thus, it is known to provide a breathable and water resistant sheet material. Such a sheet material is very useful in active outdoor applications. For example, such sheet material can be used to make articles of clothing, outdoor gear, protective articles and the like. However, the presence of some chemicals, such as insect repellant, may cause degradation of at least some of the properties of the sheet material, such as the level of water penetration resistance. Specifically, the propensity that the sheet material will permit penetration/passage of water will be increased due to the chemical presence on the sheet material. Such increased propensity to permit penetration/passage of water may be referred to as wetting out.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a waterproof, vapor-permeable and air-permeable sheet material. The sheet material includes a waterproof microporous polymer substrate and a microporous thermoplastic coating layer attached to the polymer substrate. The thermoplastic coating layer is vapor-permeable and air-permeable. The thermoplastic coating layer is at least partially integrated into pores of the polymer substrate forming an interface that prevents passage of water droplets, while permitting passage of water vapor and air, when a chemical is present on the sheet material that would otherwise cause the polymer substrate to permit passage of water droplets.

In accordance with one aspect, the present invention provides a waterproof, vapor-permeable and air-permeable sheet material. The material includes a waterproof microporous polymer substrate and a microporous thermoplastic coating layer attached to the polymer substrate. The thermoplastic coating layer is vapor-permeable and air-permeable. The thermoplastic coating layer is at least partially integrated into pores of the polymer substrate forming an interface that is resistant to chemical interference with at least the waterproof property of the sheet material.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
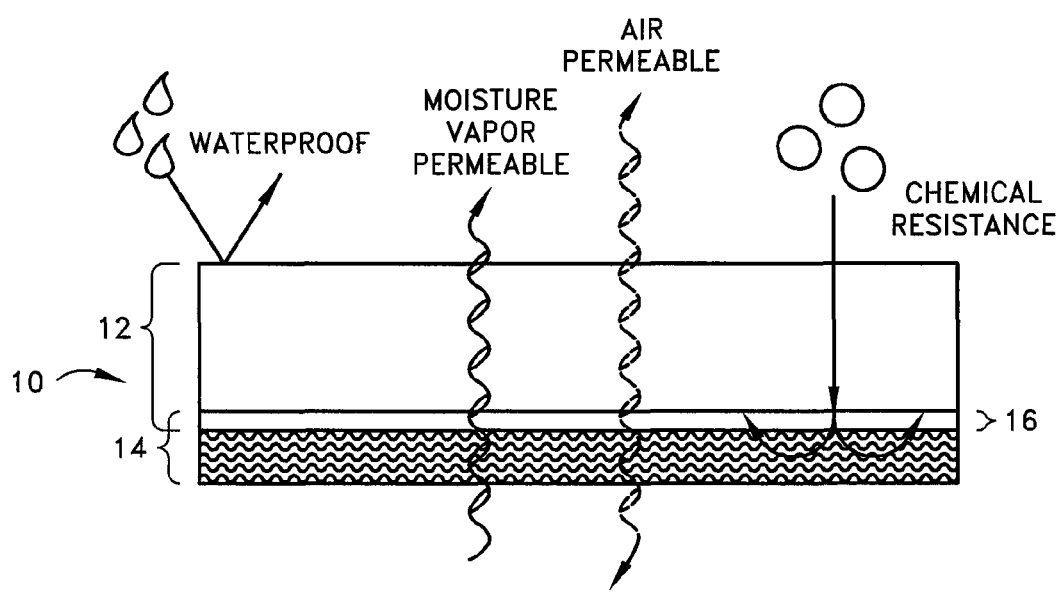
FIG. 1 is a schematic edge view of an example waterproof, water vapor-permeable and air-permeable sheet material according to one aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to FIG. 1, an example in accordance with an aspect of the present invention is shown. Specifically, the example shows a waterproof, vapor-permeable and air-permeable sheet material 10. The terminology of "sheet material" is to include membrane or film. In the shown example, the sheet material includes a waterproof porous polymer substrate 12 and a porous thermoplastic coating layer 14 attached to the polymer substrate. The substrate 12 and the coating layer 14 can be considered to be constituent portions of the sheet material 10 and thus provide a sheet material 10 that is air-permeable, vapor-permeable, waterproof, and resistance to change that would be caused by a chemical challenge agent. It is to be appreciated that waterproof is intended to mean the commonly understood resistance to penetration of non-vapor water at standard or ambient conditions.

Focusing upon the porous substrate 12, the substrate has air-permeable, vapor-permeable and waterproof characteristics. The pores of the substrate are micropores. In some specific examples, the porous substrate 12 includes at least one of the following materials: fluoropolymer, sulfonated polymer, polyamide, polyimide, and cellulosic polymer. A further specific example for the porous substrate 12 is expanded polytetrafluoroethylene (ePTFE) or microporous membrane.

Focusing upon the coating layer 14, the layer has pores. In particular, the pores are micropores. This porosity provides for air-permeable and vapor-permeable characteristics. The substrate 12 resists chemical challenge by its relatively small pore size, surface energy of the material of the substrate relative to the surface tension of the challenge agent and contact there between. The coating layer 14 also has a characteristic of chemical resistance. In particular, the coating layer 14 is resistant to the affect of one or more chemicals that would cause the sheet material 10 to otherwise lose a waterproof characteristic. The coating layer 14 is a thermoplastic. As some examples, the coating layer 14 may be thermoplastic polyurethane (TPU) or thermoplastic elastomers (TPE) of copolymeric-based systems such as polyether-polyesters or polyether-polyamides copolymers. It is worth noting that within FIG. 1 some sinusoidal shading of the coating layer 14 is provided. This shading is only to permit identification/distinction from the substrate 12 and is not intended to indicate sectioning. With regard to FIG. 1 in general, it is to be appreciated that the dimensions (i.e., length, width and thickness) of the sheet material may be varied, and the representations schematically shown in the Figure are not to be used for dimension, characteristic or property limitations.

In accordance with one aspect of the present invention, in order to provide one example of the sheet material 10 the coating layer 14 is heated to at least partially melt. While in the at least partially melted state, the coating layer material flows into and fills pores of the substrate 12. This partial flow into the substrate 12 is schematically indicated in FIG. 1 via the overlap of the bracketed areas for references numbers 12 and 14.

The coating layer material only proceeds partially into the substrate 12. Specifically in the example the coating layer 14 fills the pores at just an adjacent first portion or segment 16 of the substrate 12. This thermo-flow filling provides for the substrate 12 and the coating layer 14 to be bonded together. Or in other words, the coating layer 14 is thermally laminated to the substrate 12 while retaining the open pore structures of the substrate 12 and layer 14.

In one example, the heating of the coating layer 14 is performed in a series of heating steps. In one specific example the heating includes heating at a first temperature, subsequently heating at a second temperature that is higher than the first temperature, and then subsequently heating at a third temperature that is higher than the second temperature. A specific example of the multi-temperature heating includes heating at the first temperature in the range of 80-90° C., subsequently heating at the second temperature in the range of 90-110° C., and subsequently heating at the third temperature in the range of 110-150° C.

The heating of the coating layer 14 may be accomplished via different methods. In one example, the heating is accomplished in conjunction with application of pressure to the sheet material. In one specific example, the heating and pressure may be imparted via passing an intermediate-step sheet material 10 (i.e., the substrate 12 with the coating layer 14 applied but not yet heated) through heated press rollers. Such an approach of using heated rollers is useful if the sheet material 10 is manufactured as an elongate web. The elongate web of sheet material may be moved to pass between the heated rollers at a web speed so that large quantities of the sheet material may be produced in an economical manner. With the regard to the specific example of providing heat in a series of steps, the heating may be accomplished via a series of heated rollers, with each roller providing a different heating level. Of course, other forms of heating and pressure application, such as non-dynamic heating and pressing, are contemplated and within the scope of the present invention.

With reference to FIG. 1, the substrate 12 is hydrophobic and is also air and water vapor-permeable. These features are schematically shown in FIG. 1. As mentioned, one example material of the substrate 12 is microporous, expanded polytetrafluoroethylene. The fluoropolymer has a three-dimensional lattice type of structure that yields a plurality of microporous openings through a tortuous path that define pores small enough to prevent the passage of water droplets yet large enough to allow the passage of air and vapor. For reference, a droplet of liquid water is about 1000 times larger than the size of water in the vapor state.

Within the prepared sheet material 10, the characteristics of waterproofness, water vapor permeability, air permeability are provided. Waterproofness is the commonly understood terminology associated with the ability to prevent non-vapor water from penetrating the sheet material. Water vapor permeability is the ability to permit passage of water vapor through the sheet material. Air permeability is the ability to permit passage of air through the sheet material. Moisture vapor transmission rate, also known as MVTR, is a measure of the passage of water vapor through a sheet material expressed in grams/meter$^2$/day. Air permeability, expressed in cubic feet per minute, measures the time it takes for air to pass through the sample at a predetermined pressure drop of water across the sample. A high MVTR and air permeability results in good comfort levels since sweat and body heat pass through the membrane and are permitted to quickly move from adjacent the body.

In accordance with one aspect of the present invention, waterproofness, water vapor permeability, air permeability are provided even if a chemical that would otherwise degrade resistance to water penetration of the sheet material 10. The chemical may be considered to be a challenge agent. Such a challenge agent has at least a potential to cause an adverse affect to at least one desirable characteristic. In a specific example, the challenge agent has at least the potential to adversely affect the characteristic of being waterproof. A loss of waterproofness is associated with wetting and water penetration. By this, wetting-out could occur that would allow passage of non-vapor or liquid water. Accordingly, it is to be understood that reference to a chemical may be considered to include an understanding that the chemical is such a challenge agent. A resistance to degradation by chemical (challenge agent) is indicated by Mullen test rating (ASTM D751).

One widely used example chemical (i.e., challenge agent) that could cause the degradation of the non-vapor water penetration resistance (i.e., waterproofness) of the sheet material 10 is N,N-Diethyl-meta-toluamide, also known as DEET. Other examples of chemicals that could cause degradation include chemicals present include engine fuels (e.g., aviation, automotive, diesel) and solvents. Still further, other chemical contaminants, such as a variety of acids, are also contemplated. As mentioned, such chemicals are sometimes referred to as challenge agents because of their propensity to degrade desirable material properties. Of course the particular chemical challenge agents are not limitations on the present invention. Such chemicals, if present on the sheet material 10 would otherwise cause the microporous material of the substrate 12 to permit passage of water droplets, but one aspect of the present invention prevents such unwanted occurrence (i.e., loss of waterproofness) and thus provides a resistance to such chemicals.

DEET is a common active ingredient in insect repellents and has a relatively low surface tension that could "foul" the substrate 12 and sheet material 10 and permit the passage of liquid water therethrough. Since the sheet material 10 may be used in outdoor applications, such as in gloves, boots, tents, etc., it is beneficial for the sheet material 10 to be resistant to degradation of the waterproof property from a chemical challenge agent, such as DEET, used in insect repellant. This resistance to degradation allows the sheet material 10 to retain its waterproof, vapor permeable, and air permeable characteristics despite the presence of the chemical. Also, the sheet material 10 may be used in applications where sheet materials may contact an engine fuel (e.g., diesel fuel). Again, is it is beneficial for the sheet material 10 to be resistant to degradation of the waterproof property from a chemical challenge agent such as engine fuel.

The sheet material 10 can retain the resistance to degradation even after many hours (e.g., as many as 160 hours) of exposure to the challenge agent. Data for some example sheet material in accordance with the present invention are shown in tables 1-3. Specifically, Table 1 indicates data for two samples for testing at a 16 hour duration and provides data for MVTR (water vapor permeability), air permeability and Mullen (resistance to chemical degradation to waterproof) for two different chemical challenge agents, DEET and diesel fuel.

TABLE 1

| Materials | MVTR (g/m²/day) (JIS 1099L B) | Air Permeability (cfm) (ASTM D737) | Mullen (ASTM D751) after 16-hr Exposure to DEET (N,N-Diethyl-meta-toluamide) | Sustained Low Pressure Hydrostatic Test at 1 psi/10 min (AATCC 127) after 16-hr DEET (N,N-Diethyl-meta-toluamide) | Sustained Low Pressure Hydrostatic Test at 1 psi/10 min (AATCC 127) after 16-hr Diesel Fuel |
|---|---|---|---|---|---|
| First Sample of ePTFE + polyurethane | 54,500 | 0.15 | 156 | Passed with no leakage | Passed with no leakage |
| Second repeatable sample of ePTFE + polyurethane | 36,413 | 0.097 | 156 | Passed with no leakage | Passed with no leakage |

Table 2 provides an indication of durability. Specifically, the indication of durability is provided by data for wash durability. For these tests, table 2 indicates that no leakage occurred.

TABLE 2

| Materials | Durability Wash | 2000 cycles Gelbo Flex at 25° C. (ASTM F 392-93) followed by Low Pressure Hydrostatic Test (AATCC 127) at 1 psi/10 min |
|---|---|---|
| First Sample of ePTFE + polyurethane | No delamination after 200 hours continuous agitation | Passed with no leakage |
| Second repeatable sample of ePTFE + polyurethane | No delamination after 200 hours continuous agitation | Passed with no leakage |

Figure 2:
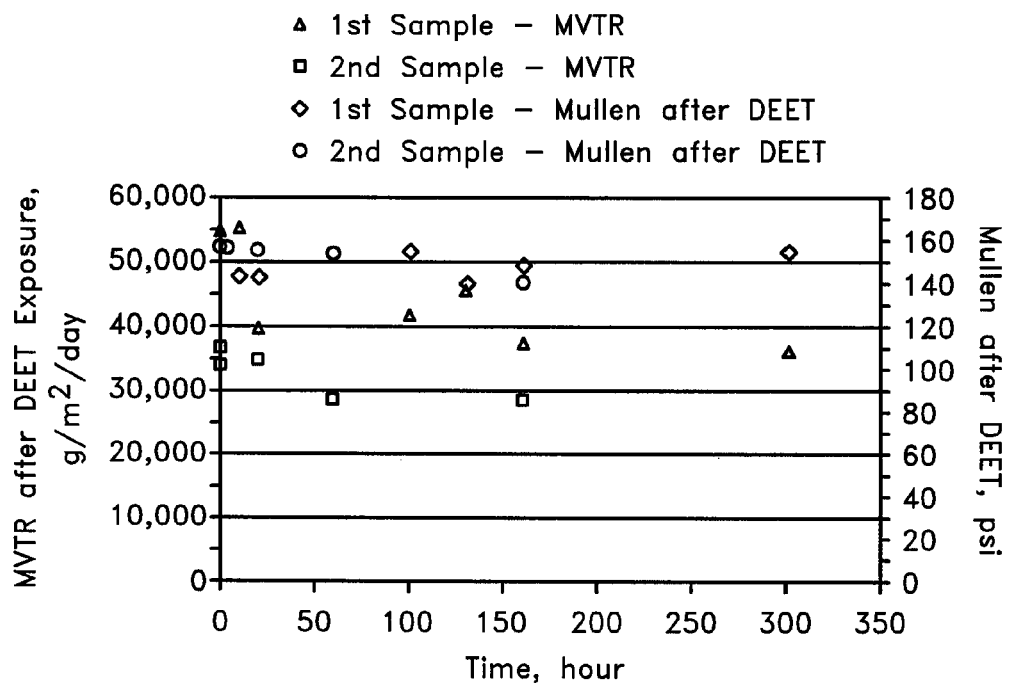
FIG. 2 is a plot of moisture vapor transmission rate in relationship to time for samples with and without the presence of a sample chemical challenge agent.
Figure 3:
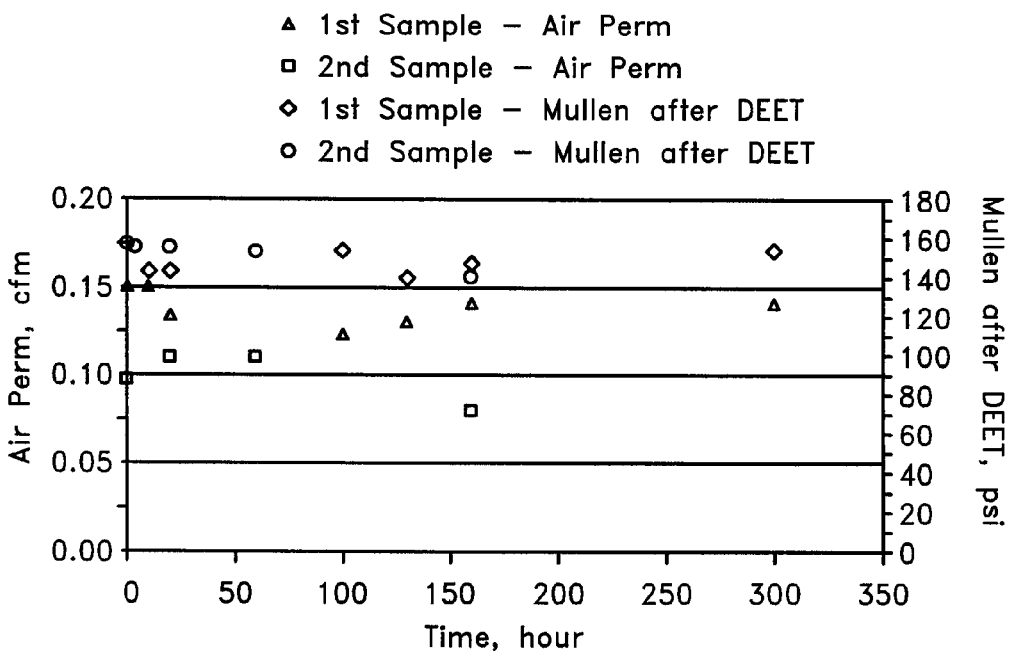
FIG. 3 is a plot of air permeability in relationship to time for samples with and without the presence of the sample chemical challenge agent.

Table 3 shows test data for scenario of the chemical challenge agent DEET for time periods of up to 30.0 hours. FIG. 2 is a plot of MVTR (water vapor permeability) for the samples without and with the chemical challenge agent DEET. FIG. 3 is a plot of air permeability for the samples without and with the chemical challenge agent DEET. From the data it is to be appreciated that minimal change in water vapor permeability air permeability occurs despite the presence of the chemical challenge agent. Consequently, the present invention may be considered to help contribute to good comfort levels.

TABLE 3

| Materials | MVTR (g/m2/day) (JIS 1099L-B) | Air Permeability (cfm) (ASTM D737) | Mullen (ASTM D751) after 16-hr Exposure to DEET (N,N-Diethyl-meta-toluamide) | Time, hours |
|---|---|---|---|---|
| First Sample of ePTFE + polyurethane | 54,500 | 0.15 | 156 | 0 |
| | 55,000 | 0.15 | 143 | 10 |
| | 39,500 | 0.133 | 143 | 20 |
| | 41,477 | 0.123 | 154 | 100 |
| | 45,204 | 0.13 | 140 | 130 |
| | 37,265 | 0.14 | 147.68 | 160 |
| | 36,070 | 0.14 | 154 | 300 |
| Second repeatable sample of ePTFE + polyurethane | 36,413 | 0.097 | 156 | 0 |
| | 34,554 | 0.11 | 154.55 | 20 |
| | 28,477 | 0.11 | 153 | 60 |
| | 28,349 | 0.08 | 140 | 160 |

Also, the sheet material 10 does provide the partial penetration of the coating layer 14 into the substrate 12. This penetration could be considered to be layer overlap. This overlapping is to indicate an interpenetration, intermingling, intermigration, impregnation or the like of the two constituent layers to provide bonding. This interpenetration or the like may help to provide some enhanced properties. One example is that of the property of retaining an overall resistance to water drop penetration (i.e., waterproofness) of the sheet material 10 despite presence of a chemical on the sheet material that would otherwise cause the sheet material 10 to lose its resistance to water drop penetration. Such retention of overall resistance to water drop penetration (i.e., waterproofness) is provided by the segment 16 of interpenetration or the like within the sheet material 10.

The interpenetration or the like is accomplished in part due to the structure of the substrate 12. Recall that one specific example for the substrate 12 is expanded polytetrafluoroethylene. The structure of the expanded polytetrafluoroethylene is a three-dimensional matrix or lattice type structure that includes numerous nodes interconnected by numerous fibrils. Surfaces of the nodes and fibrils define numerous interconnecting pores that extend through the substrate 12. Within this specific example, the material of the coating layer 14 interpenetrates into these pores. Also, as mentioned, the interpenetration does not necessarily extend for the entire thickness of the substrate 12.

It is to be appreciated that the overlap also prevents delamination of the coating 14 from the substrate 12. This prevention of delamination enhances the durability of the sheet material 10. As mentioned with regard to Table 1, samples of the sheet material 10 being washed for 200 hours did not result in delamination. Of course, such duration of such test washing and mentioned lack of delamination are not to be considered limitations upon the present invention.

The final sheet material 10 may have a thickness of less than 100 micron, or 0.1 millimeters. Of course, such an example dimension need not be a limitation upon the present invention. This low thickness, along with a light weight, adds to the comfort level of the sheet material 10. The sheet material 10 may also be combined with another fabric layer on both sides for use in the construction of outerwear, such as gloves, boots, tents, etc.

Example uses of the sheet material 10 include, but are not limited to, gloves, hats, coats, jackets, shirts, pants, under garments, shoes, boots, protective wear, various other articles of clothing, backpacks, sleeping bags, tents, various other outdoor gear, and the like.

With regard to uses that involve something worn by a person, it is must be appreciated that as the person sweats both water vapor and liquid perspiration are generated on the skin. In such an application it is contemplated that the coating layer would innermost, toward the person and the substrate 12 would be outermost, away from the person. A high MVTR and air permeability may provide for this water vapor and liquid sweat to quickly pass through the sheet material 10. As such, the sheet material is quite useful for the use examples mentioned above concerning items that are worn by a person. Of course, the present invention is not limited to such uses and other uses are contemplated.

Figure 4:
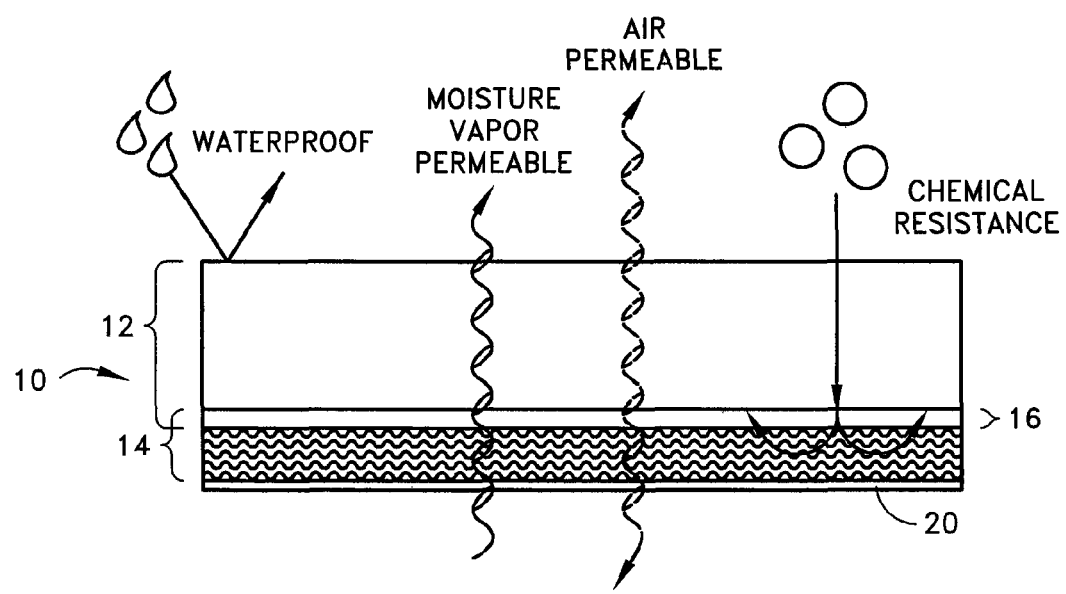
FIG. 4 is a schematic edge view of another example waterproof, vapor-permeable and air-permeable sheet material according to another aspect of the present invention.

Also, it is contemplated that the sheet material may include additional layers and/or the sheet material may be incorporated into multilayer sheet. Some examples of such additions to the sheet material and/or the use of sheet material being included into a multilayer sheet include the use of at least one of woven fabrics, nonwoven fabrics, knitted fabrics, and yarn. Of course, other materials and/or fabrics are contemplated. FIG. 4 shows just one example of such an addition to the sheet material via the addition of an additional layer 20. The additional layer is shown adjacent to the coating layer, however it is to be understood that the additional layer may be located elsewhere.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A waterproof, vapor-permeable, air-permeable and chemical resistant sheet material including:
   a waterproof, vapor-permeable and air-permeable microporous polymerized polymer substrate sheet layer;
   a microporous polymerized thermoplastic sheet layer attached to the polymer substrate sheet layer, the thermoplastic sheet layer being vapor-permeable and air-permeable; and
   the thermoplastic sheet layer being at least partially interpenetrated into pores of the polymer substrate sheet layer, with a portion of the polymerized thermoplastic sheet layer within pores of the microporous sheet layer, forming an interface that prevents passage of water droplets, while permitting passage of water vapor and air, when a chemical is present on the sheet material that would otherwise cause the polymer substrate sheet layer to permit passage of water droplets.

2. The sheet material of claim 1, wherein the polymer substrate sheet layer is expanded polytetrafluoroethylene.

3. The sheet material of claim 1, wherein the polymer substrate sheet layer includes at least one of a fluoropolymer, sulfonated polymer, polyamide, polyimide, and cellulosic polymer.

4. The sheet material of claim 1, wherein the thermoplastic sheet layer is polyurethane.

5. The sheet material of claim 1, wherein the thermoplastic sheet layer is an elastomer.

6. The sheet material of claim 1, wherein the sheet material includes at least one of woven fabrics, nonwoven fabrics, knitted fabrics, and yarn.

7. The sheet material of claim 1, wherein the at least partially interpenetrated thermoplastic coating sheet layer into the pores of the polymer substrate sheet layer is provided by heated melt of the thermoplastic coating layer.

8. A waterproof, vapor-permeable, air-permeable and chemical resistant sheet material of including:
   a waterproof, vapor-permeable and air-permeable microporous polymerized polymer substrate layer;
   a microporous thermoplastic coating layer attached to the polymer substrate layer, the thermoplastic coating layer being vapor-permeable and air-permeable; and
   the thermoplastic coating layer being at least partially interpenetrated into pores of the polymer substrate layer forming an interface that prevents passage of water droplets, while permitting passage of water vapor and air, when a chemical is present on the sheet material that would otherwise cause the polymer substrate layer to permit passage of water droplets;
   wherein the at least partially interpenetrated thermoplastic coating layer into the pores of the polymer substrate layer is provided by heated melt of the thermoplastic coating layer and the heated melt includes heating a first temperature, subsequently heating at a second temperature that is higher than the first temperature, and then subsequently heating at a third temperature that is higher than the second temperature.

9. A waterproof, vapor-permeable, air-permeable and chemical resistant sheet material including:
   a waterproof, vapor-permeable and air-permeable microporous polymerized polymer substrate sheet layer;

a microporous thermoplastic sheet layer attached to the polymer substrate, the thermoplastic sheet layer being vapor-permeable and air-permeable; and the thermoplastic sheet layer being at least partially interpenetrated into pores of the polymer substrate sheet layer forming an interface that is resistant to chemical interference with at least the waterproof property of the sheet material.

10. The sheet material of claim 9, wherein the polymer substrate sheet layer is expanded polytetrafluoroethylene.

11. The sheet material of claim 9, wherein the polymer substrate sheet layer includes at least one of a fluoropolymer, sulfonated polymer, polyamide, polyimide, and cellulosic polymer.

12. The sheet material of claim 9, wherein the thermoplastic sheet layer is polyurethane.

13. The sheet material of claim 9, wherein the thermoplastic sheet layer is an elastomer.

14. The sheet material of claim 9, wherein the sheet material includes at least one of woven fabrics, nonwoven fabrics, knitted fabrics, and yarn.

15. The sheet material of claim 9, wherein the at least partially interpenetrated thermoplastic sheet layer into the pores of the polymer substrate sheet layer is provided by heated melt of the thermoplastic sheet layer.

16. A waterproof, vapor-permeable, air-permeable and chemical resistant sheet material including:

a waterproof, vapor-permeable and air-permeable microporous polymerized polymer substrate layer;

a microporous thermoplastic coating layer attached to the polymer substrate, the thermoplastic coating layer being vapor-permeable and air-permeable; and the thermoplastic coating layer being at least partially interpenetrated into pores of the polymer substrate layer forming an interface that is resistant to chemical interference with at least the waterproof property of the sheet material wherein the at least partially interpenetrated thermoplastic coating layer into the pores of the polymer substrate layer is provided by heated melt of the thermoplastic coating layer and the heated melt includes heating a first temperature, subsequently heating at a second temperature that is higher than the first temperature, and then subsequently heating at a third temperature that is higher than the second temperature.

* * * * *

UNITED STATES PATENT AND TRADEMARK OFFICE
CERTIFICATE OF CORRECTION

PATENT NO. : 8,334,227 B2  
APPLICATION NO. : 12/417476  
DATED : December 18, 2012  
INVENTOR(S) : Yit-Hong Tee et al.

Page 1 of 1

It is certified that error appears in the above-identified patent and that said Letters Patent is hereby corrected as shown below:

In column number 5, line 64, please delete "30.0" and insert therefor --300--.

Signed and Sealed this
Twelfth Day of March, 2013

Teresa Stanek Rea
*Acting Director of the United States Patent and Trademark Office*